(12) United States Patent
Takemura et al.

(10) Patent No.: US 7,219,006 B2
(45) Date of Patent: May 15, 2007

(54) KNOCK DETERMINING APPARATUS

(75) Inventors: Yuichi Takemura, Anjo (JP); Rihito Kaneko, Nishikamo-gun (JP); Kenji Kasashima, Nishikamo-gun (JP)

(73) Assignees: DENSO Corporation, Kariya, Aichi-pref. (JP); Toyota Jidosha Kabushiki Kaisha, Toyota, Aichi-pref. (JP)

( * ) Notice: Subject to any disclaimer, the term of this patent is extended or adjusted under 35 U.S.C. 154(b) by 0 days.

(21) Appl. No.: 11/487,601

(22) Filed: Jul. 17, 2006

(65) Prior Publication Data
US 2007/0016387 A1 Jan. 18, 2007

(30) Foreign Application Priority Data
Jul. 15, 2005 (JP) ............... 2005-207638

(51) Int. Cl.
*F02D 45/00* (2006.01)
*G06F 19/00* (2006.01)

(52) U.S. Cl. ..................... 701/111; 73/35.09

(58) Field of Classification Search ........... 701/111, 701/102, 115; 73/35.09; 123/406.21, 406.58, 123/406.59
See application file for complete search history.

(56) References Cited

U.S. PATENT DOCUMENTS

| 4,617,895 A | 10/1986 | Sakakibara et al. |
| 5,144,928 A * | 9/1992 | Komurasaki ........... 123/406.16 |
| 5,485,380 A | 1/1996 | Takasuka et al. |
| 6,520,149 B2 | 2/2003 | Kokubo et al. |
| 6,688,286 B2 | 2/2004 | Kokubo et al. |
| 2005/0234633 A1 | 10/2005 | Takemura et al. |
| 2006/0142925 A1 * | 6/2006 | Kaneko et al. ........... 701/111 |

FOREIGN PATENT DOCUMENTS

| EP | 0 889 309 | 1/1999 |
| GB | 2265006 A | 9/1993 |
| JP | 8-19890 | 3/1996 |
| JP | 2001-140740 A * | 5/2001 |
| JP | 2004-353531 A * | 12/2004 |

OTHER PUBLICATIONS

International Search Report dated Nov. 6, 2006.

* cited by examiner

*Primary Examiner*—Hieu T. Vo
(74) *Attorney, Agent, or Firm*—Nixon & Vanderhye P.C.

(57) ABSTRACT

A knock determining apparatus includes a sensor which outputs a waveform signal corresponding to a knock state, and at least one of a first to a third knock determiner which determines a knock state based on a vibration intensity distribution of the waveform signal. A knock detector compares the vibration intensity of the waveform signal with a threshold, and detects a knock when the vibration intensity exceeds the threshold. This threshold is corrected based on a knock determining result by the first to the third knock determiner.

19 Claims, 11 Drawing Sheets

KNOCK DETERMINING APPARATUS

CROSS REFERENCE TO RELATED APPLICATIONS

This application is based on Japanese Patent Applications No. 2005-207638 filed on Jul. 15, 2005, the disclosure of which is incorporated he reference.

FIELD OF THE INVENTION

The present invention relates to an apparatus for determining occurrence of a knock in an internal combustion engine.

BACKGROUND OF THE INVENTION

A knock determining apparatus of a typical internal combustion engine includes a knock sensor attached to the cylinder block of the internal combustion engine. The knock sensor detects vibration of the cylinder block caused by a knock. The determining apparatus extracts the knock frequency component from an output signal of the knock sensor by a band-pass filter every time one combustion is occurred, and compares a peak value of the knock frequency component for one combustion with a knock determination threshold value to conduct knock determination.

SUMMARY OF THE INVENTION

It is an object of the present invention to provide a knock determining apparatus capable of correcting the knock determination threshold appropriately without deteriorating a drivability of a vehicle.

A knock determining apparatus of the present invention for an internal combustion engine includes a sensor outputting a waveform signal which corresponds to a knock state of the internal combustion engine; and at least one of a first knock determining means, a second knock determining means, and a third knock determining means, for determining the knock state based on a vibration intensity distribution of the waveform signal which is outputted from the sensor during a predetermined number of times of combustions.

The first knock determining means includes a calculating means for calculating a center value of the vibration intensity distribution and a dispersion index in a region where the vibration intensity is smaller than the center value, and a reference determining means for determining a statistical reference level based on the center value and the dispersion index. The first knock determining means determines the knock state based on a number of times the vibration intensity exceeds the statistical reference level during the predetermined number of times of combustions, The second knock determining means includes an average calculating means for calculating an average of the vibration intensity distribution and a dispersion index relating to the average, a region establishing means for dividing the vibration intensity distribution in such a manner as to establish a plurality of regions based on the average and the dispersion index relating to the average, and a counter means for respectively counting a number of the vibration intensity in each region. The second knock determining means determines the knock state based on the number of the vibration intensity in each region and/or a ratio of the numbers of the vibration intensity between in each region.

The third knock determining means includes an index average calculating means for calculating an average of the dispersion index. The third knock determining means determines the knock state based on the average of the dispersion index.

BRIEF DESCRIPTION OF THE DRAWINGS

The above and other objects, features, and advantages of the present invention will become more apparent from the following detailed description made with reference to the accompanying drawings, in which like parts are designated by like reference number and in which.

DETAILED DESCRIPTION OF THE PREFERRED EMBODIMENTS

An embodiment of the present invention will be described hereinafter with reference to the drawings.

Figure 1:
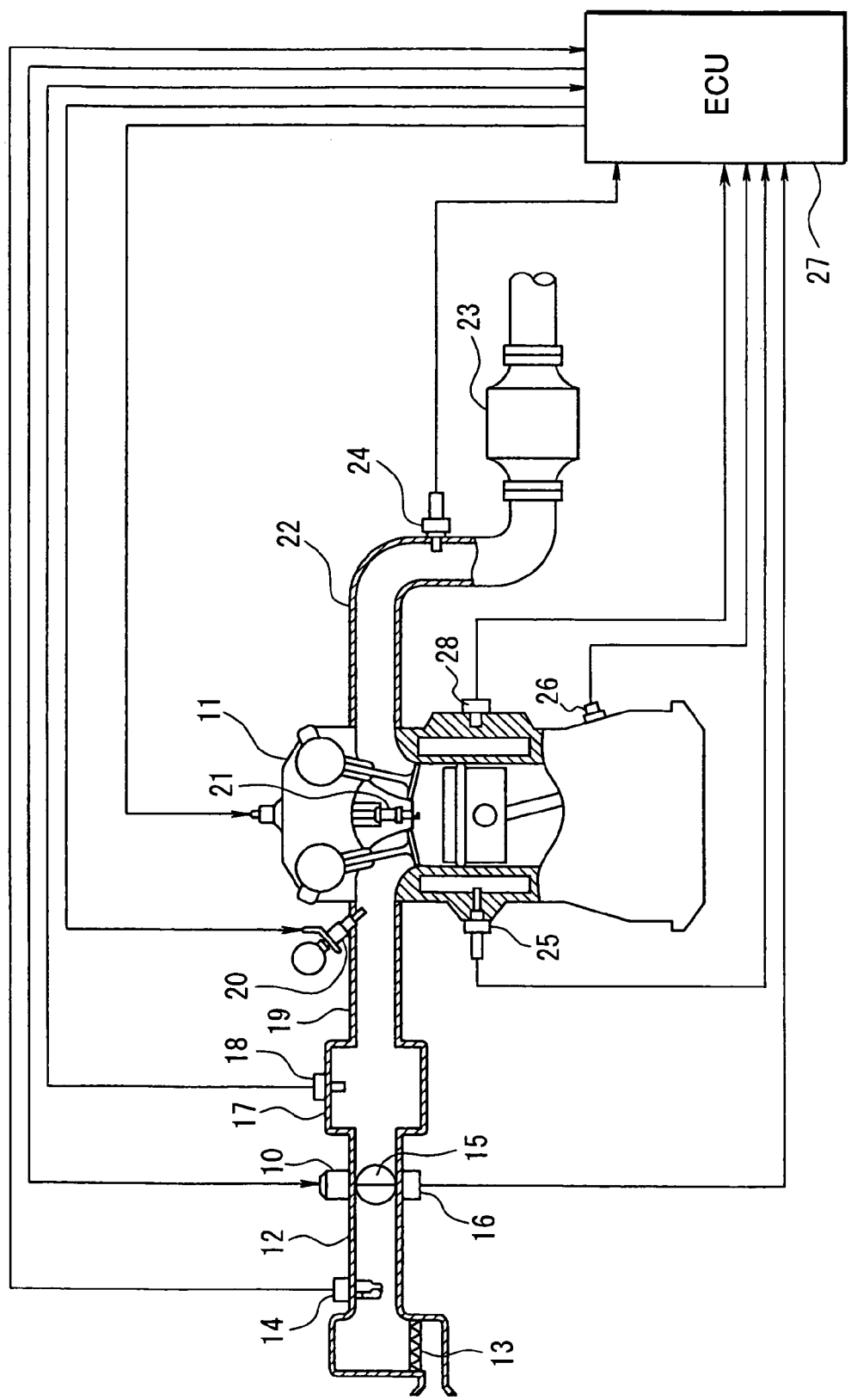
FIG. 1 is a schematic view showing an engine control system having a knock determining apparatus.

FIG. 1 is a schematic view of an engine control system including a knock determining apparatus. An air cleaner 13 is arranged upstream of an intake pipe 12 of an internal combustion engine 11. An airflow meter 14 detecting an intake air flowrate is provided downstream of the air cleaner 13. A throttle valve 15 driven by an electric motor 10 and a throttle position sensor 16 detecting a throttle position are provided downstream of the air flow meter 14.

A surge tank 17 including an intake air pressure sensor 18 is provided down stream of the throttle valve 15. The intake air pressure sensor 18 detects intake air pressure. An intake manifold 19 is connected to the surge tank 17 in order to introduce intake air into each cylinder. A fuel injector 20 is respectively mounted on the intake manifold 19 at a vicinity of an intake air port of each cylinder. A spark plug 21 is mounted on a cylinder head of the engine 11, respectively corresponding to each cylinder, to ignite air-fuel mixture in each cylinder.

An exhaust pipe 22 of the engine 11 is provided with a three-way catalyst 23 purifying CO, HC, and NOx in the exhaust gas. An air-fuel ratio sensor 24 is disposed upstream of the three-way catalyst 23 to detect air-fuel ratio of the exhaust gas. A coolant temperature sensor 25 detecting a coolant temperature, a knock sensor 28 detecting a knock vibration and a crank angle sensor 26 outputting a pulse signal every predetermined crank angle of a crankshaft of the engine 11 are disposed on a cylinder block of the engine 11. The crank angle and an engine speed are detected based on the output signal of the crank angle sensor 26. A cylinder inner pressure sensor (not shown) can be used instead of the knock sensor 28.

The outputs from the above sensors are inputted into an electronic control unit 27, which is referred to an ECU hereinafter. The ECU 27 includes a microcomputer that executes an engine control program stored in a ROM (Read Only Memory) to control a fuel injection amount of a fuel injector 20 and an ignition timing of the spark plug 21. The ECU 27 includes a RAM (Random Access Memory) that stores data to execute programs The ECU 27 compares a peak value of a knock frequency component of a sensor output with a knock determining threshold every one combustion so that it is determined whether a knock is appeared every one combustion. When it is determined that the knock is occurred, an ignition timing is retarded to restrict the knock. When it is consecutively determined that no knock is occurred, the ignition timing is advanced, whereby an engine performance is enhanced and a fuel consumption is reduced without knock noise.

Figure 2:
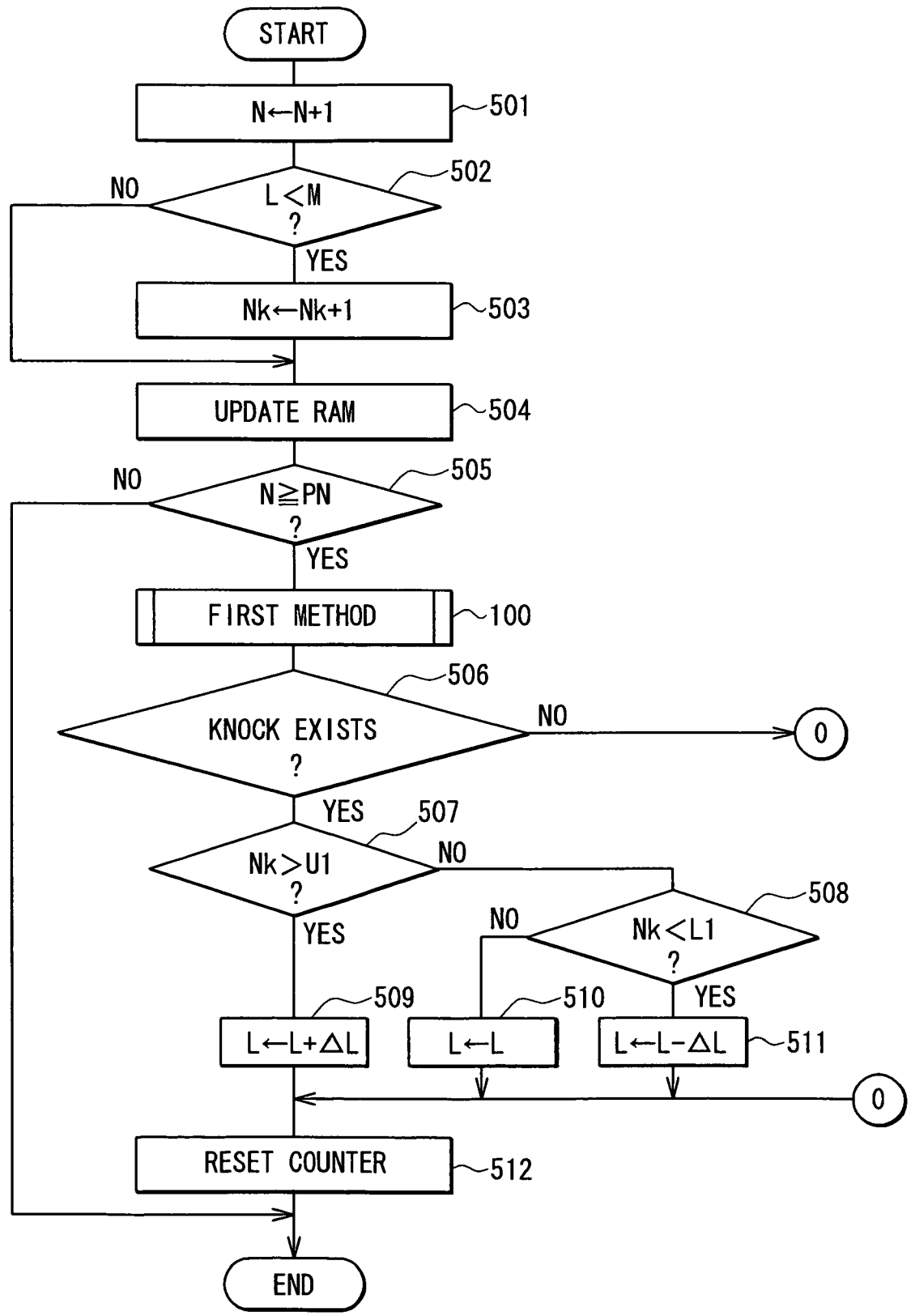
FIG. 2 is a flowchart showing a knock determining program.
Figure 3:
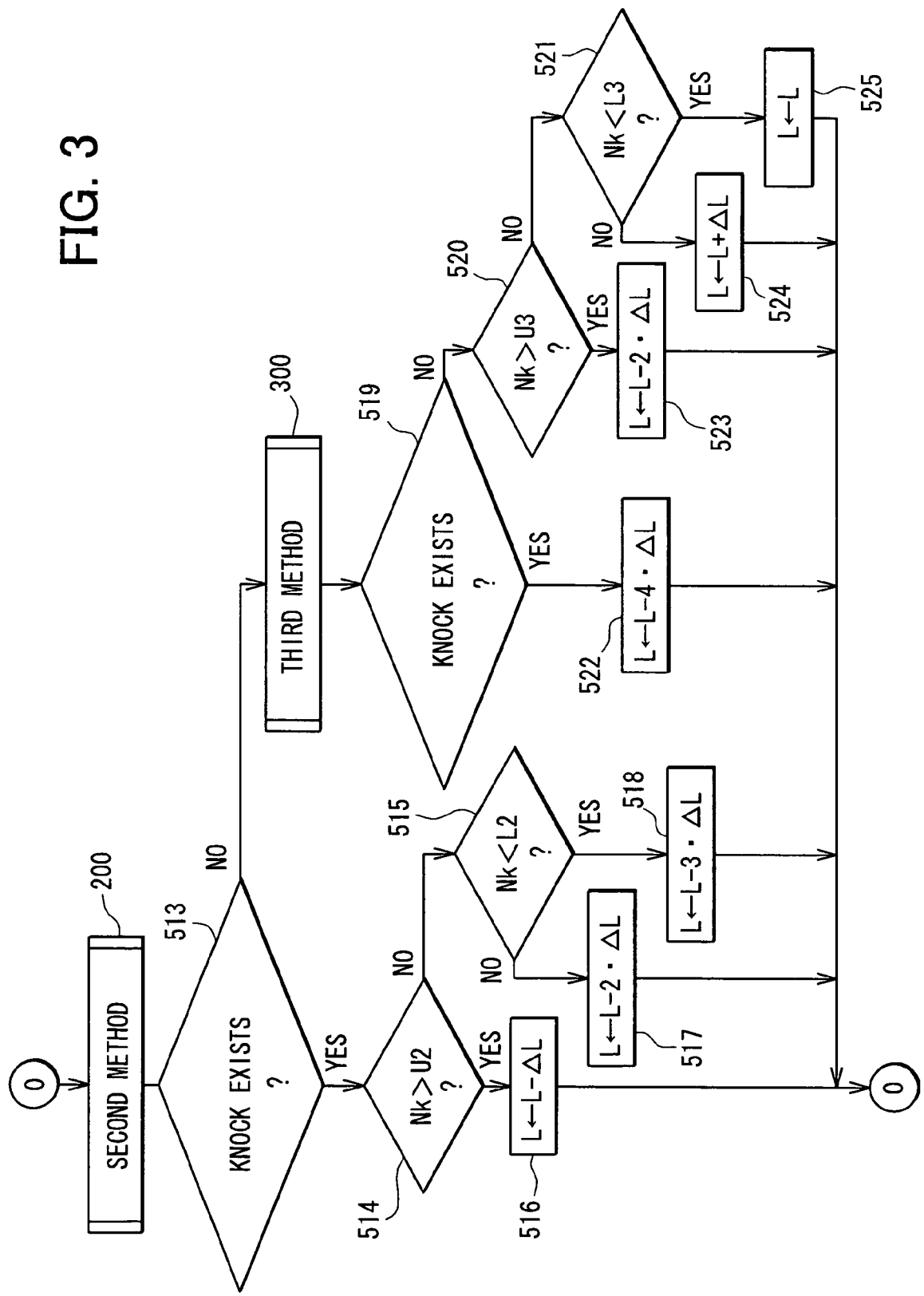
FIG. 3 is a flowchart showing a knock determining program.

FIGS. 2 and 3 are flowcharts showing a knock determining routine in which the knock determining threshold is changed. In step 501, a counter number N of a combustion counter is incremented by 1. The combustion counter is provided in the ECU 27. This process in step 501 is executed every one combustion of the engine 11. The combustion counter and following counters are provided in the ECU 27.

In step 502, a vibration intensity M of the knock vibration is obtained based on a waveform signal outputted from the knock sensor 28. The vibration intensity M is compared with a predetermined reference level L. The reference level L is predetermined based on experiments, and can be referred to as the knock determining threshold. Alternatively, the vibration intensity M can be compared with a value which is obtained by multiplying the reference level L and a correlation coefficient.

When the answer is YES is step 502, the computer determines that the knock is occurred during this combustion. Then, the procedure proceeds to step 503 in which a counter number Nk of a knock counter is incremented by 1. When the answer is No in step 502, the procedure proceeds to step 504. In the knock determining routine, the processes in step 502 and 504 correspond to a knock determining logic which determines whether the knock is occurred every one combustion.

In step 504, the RAM is updated for a first to a third knock determining method, which will be described later. In the first to the third knock determining method, the vibration intensity M is statistically processed during a predetermined times of combustion in order to determine whether the knock is occurred or not. In step 505, the computer determines whether the number of times of combustion excesses a predetermined number of times. The number of times of combustion is expressed by the counter number N, and the predetermined number of times is expressed by PN. When the answer is YES in step 505, the procedure proceeds to step 100. When the answer is No, the procedure ends. In the first to the third knock determining method, the reference level L is changed according to whether the knock is occurred or not.

The first to the third knock determining method will be described in detail hereinafter. The first to the third knock determining method is referred to as a first to a third method in short.

Figure 4:
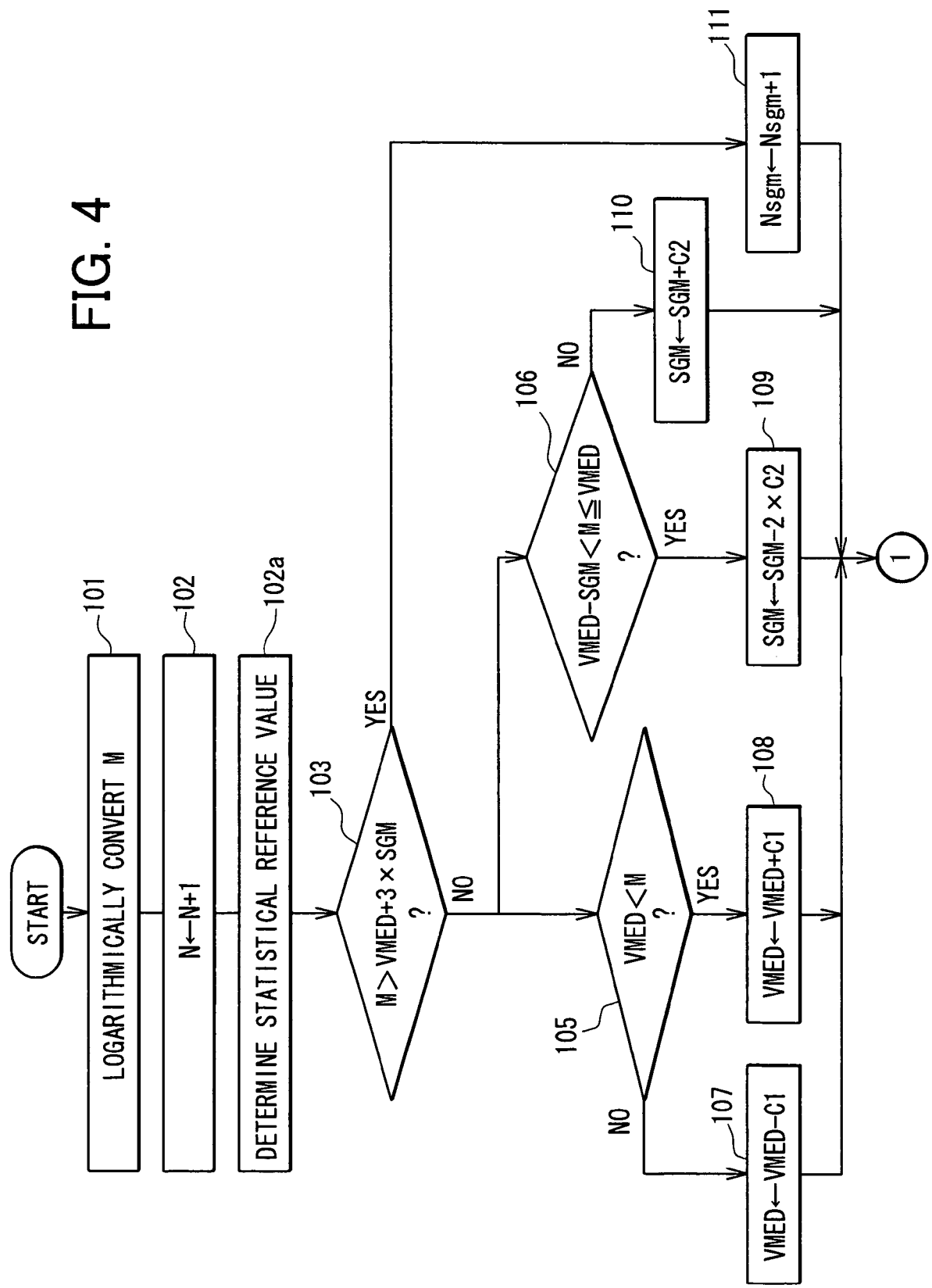
FIG. 4 is a flowchart showing a first knock determining method.
Figure 5:
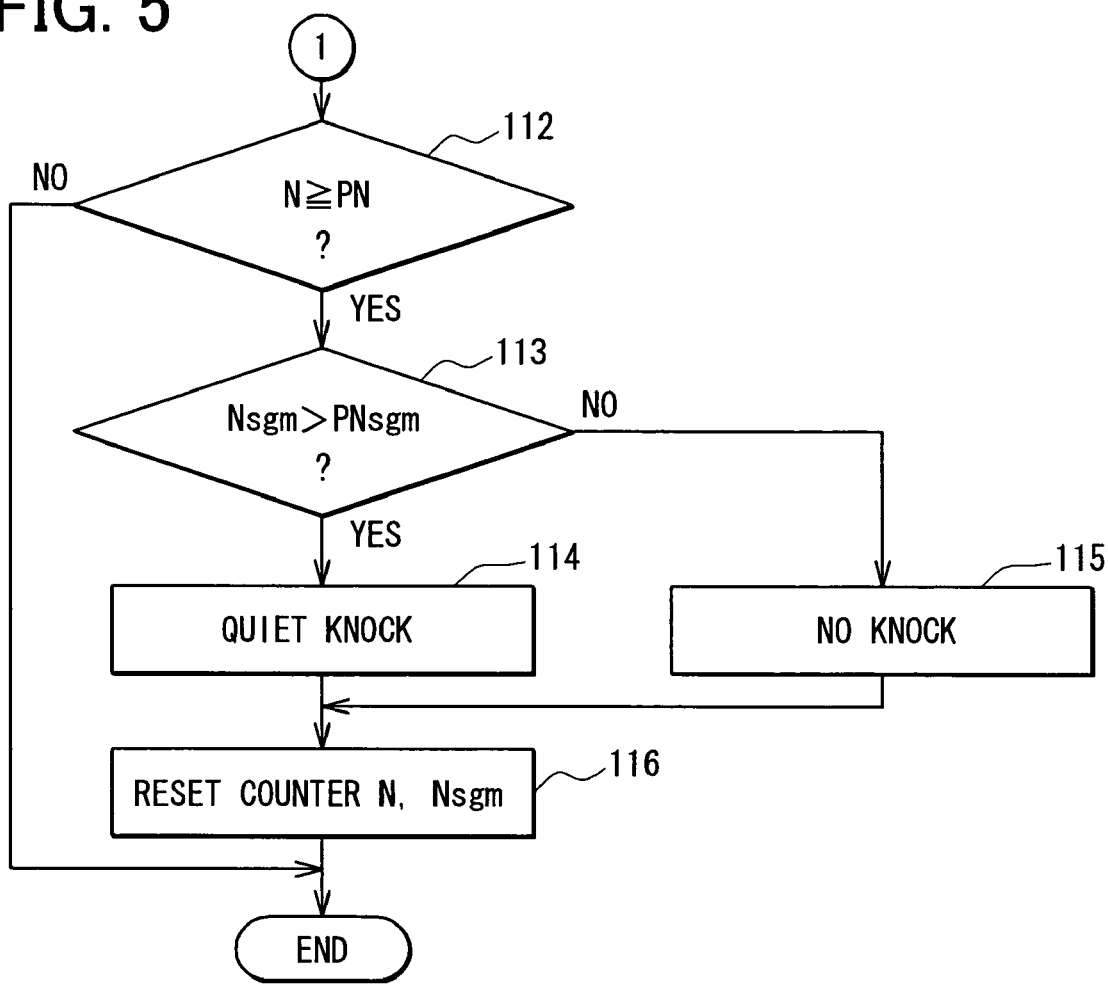
FIG. 5 is a flowchart showing a first knock determining method.

Referring to FIGS. 4 and 5, the first method is described. In step 101 of the first method routine, the vibration intensity M is logarithmically converted into logarithm, whereby a distribution of the vibration intensity, in a case no knock is occurred, is made to be a normal distribution. At the same time, a center value VMED and a dispersion index SGM are calculated with respect to a distribution of the vibration intensity M.

Figure 6:
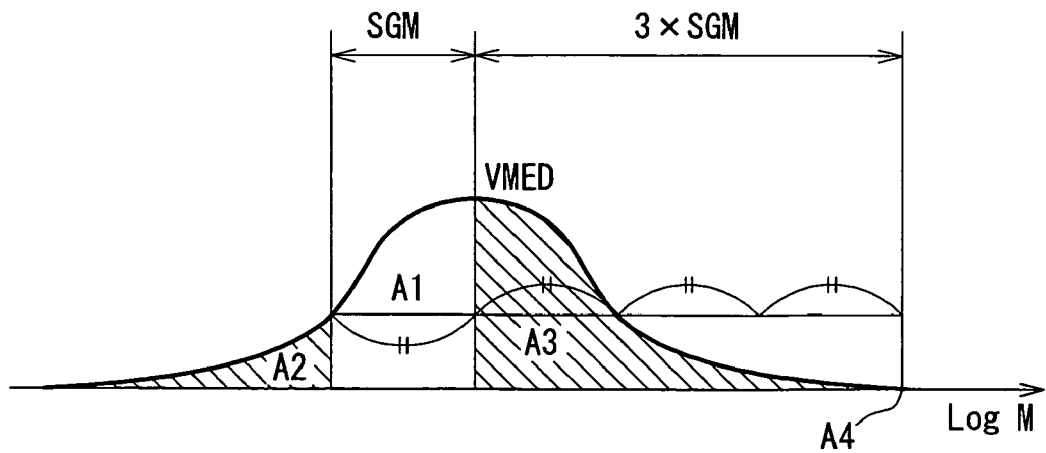
FIG. 6 is a chart for explaining a center value and a dispersion index.

FIG. 6 is a graph showing a typical distribution of the vibration intensity M. In FIG. 6, the horizontal axis of the graph represents logarithm of the vibration intensity M, and the vertical axis represent frequency thereof. The center value VMED corresponds to a center value of the distribution, and the dispersion index SGM corresponds to a dispersion which is calculated based on the center value VMED. Technically speaking, the dispersion index SGM is not a standard deviation.

As shown in FIG. 6, an area A1 in a region from "VMED −SGM" to "VMED" is approximately half of a total area of the area A2 and A3 (A2+A3). That is, a ratio between the area A1 and total area of A2 and A3 is approximately 1:2. One third of the vibration intensity M exists in the area A1. There is no vibration in a region outside of a value A4, which is far from the center value VMED by three times of the dispersion index SGM. The value A4 corresponds to a position represented by "VMED+3×SGM". In the first method, the value A4 is defined as a statistical reference value A4. In the region outside of the reference value A4, the number of vibration which exceeds the reference level L is counted. This counter number of vibration is denoted by Nsgm. A knock occurring state is determined according to the counter number Nsgm.

Figure 7B:
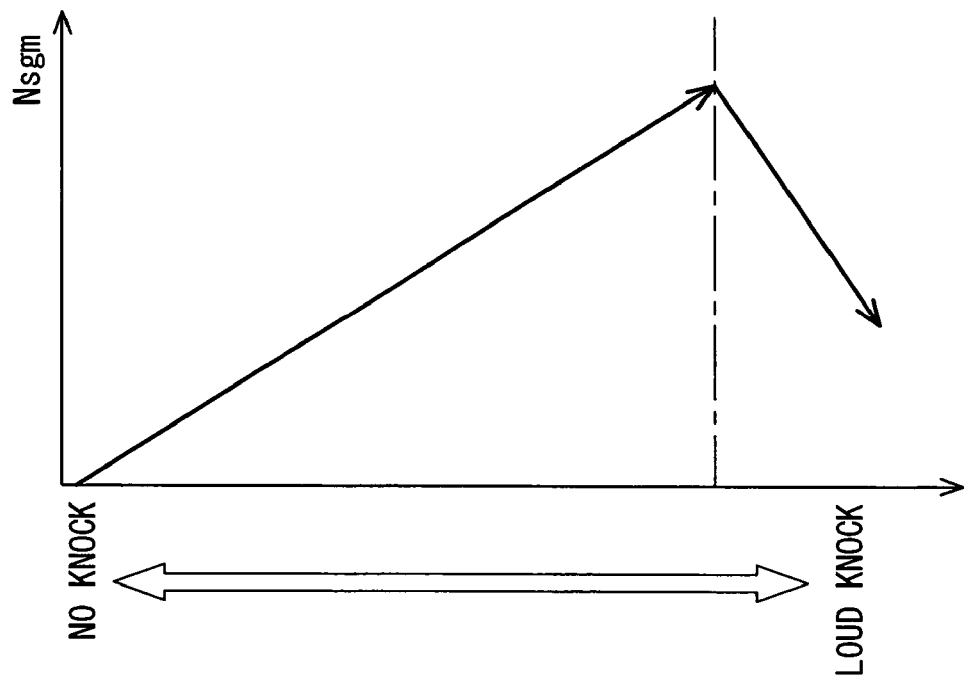
FIG. 7B is a chart showing a relationship between a knock state and a counter number Nsgm.
Figure 7A:
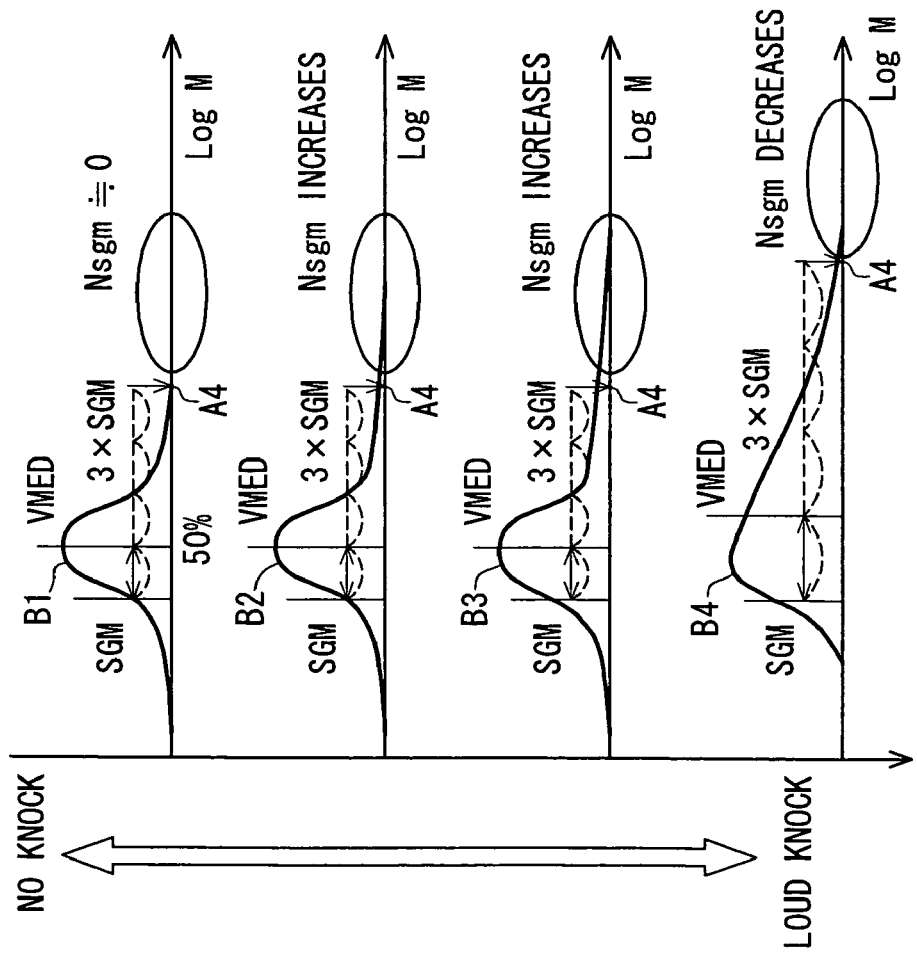
FIG. 7A is a chart for explaining the first knock determining method.

FIG. 7A shows vibration intensity distributions B1 to B4. From in the distribution B1 to the distribution B3, the waveform become distorted gradually in the regions right of the center value VMED. From in the distribution B1 to the distribution B3, the number Nsgm increases in the region outside of the reference value A4, whereby the knock determination can be performed in the first method.

Referring to FIGS. 4 and 5, the first method is specifically described hereinafter. After the combustion counter is updated in step 102, the procedure proceeds to step 102a in which the reference value A4 is determined. The reference value A4 can be a value other than the value of "VMED+ 3×SGM". Since the combustion counter is updated in step 501, the update of the combustion counter in step 102 is omitted in actuality.

In step 103, the computer determines whether the vibration intensity M is greater than the reference value A4 (VMED+3×SGM). When the answer is YES, the procedure proceeds to step 111 in which the counter number Nsgm is incremented by 1. Then, procedure goes back to step 112 (FIG. 5) to confirm the counter number N exceeds the predetermined number PN, and advances to step 113. The same process as in step 112 is conducted in step 505, so that step 112 can be omitted.

In step 113, the computer determines whether the counter number Nsgm is greater than a predetermined number relating to the counter number Nsgm. When the answer is YES in step 113, the procedure proceeds to step 114 in which the computer determines a relatively quiet knock is occurred. When the answer is NO in step 113, the procedure proceeds to step 115 in which the computer determines that no knock is occurred. Then, the counter number N and the counter number Nsgm are reset in step 116 to end the first method.

FIG. 7B is a chart showing a relationship between the knock state and the counter number Nsgm. The vertical axis of this chart represents the knock state, and the horizontal axis represents the counter number Nsgm. The uppermost point in the vertical axis represents a situation that no knock exists. The vibration intensity increases according as it goes to lower part in the vertical axis. In the vibration intensity distribution B1 to B3, the relatively quiet knock is occurred. As shown in FIG. 7B, in a case the relatively quiet knock is occurred, the knock state and the counter number Nsgm have a linear relationship between each other. Hence, according to the first method, in the region of the relatively quiet knock, the computer can determines the knock state and the vibration intensity thereof.

In a case that a relatively loud knock is occurred, the vibration intensity distribution becomes distorted as shown in the distribution B4. The center value VMED and the dispersion index SGM are increased in a large amount, so that the reference value A4 is shifted to right in FIG. 7A. Thereby, the counter number Nsgm is reduced so that comparison in step 113 cannot be performed properly. Thus, in the case that the relatively quiet knock is occurred, the knock state cannot be determined correctly according to the first method.

In the case that the relatively quiet knock is occurred, it is preferable that the center value VMED and/or the dispersion index SGM is corrected as shown in step 105 to 110. A specific description is omitted with respect to this correction. In step 105 and step 106, the vibration intensity M is compared with specific values. In step 107 and step 108, the center value VMED is increased or decreased by a predetermined value C1. In step 109 and step 110, the dispersion index SGM is increased or decreased by a predetermined value C2. The corrected dispersion index SGM is substantially equal to the standard deviation in a case that the vibration intensity distribution is a normal distribution, whereby more appropriate knock determination can be performed.

Figure 8:
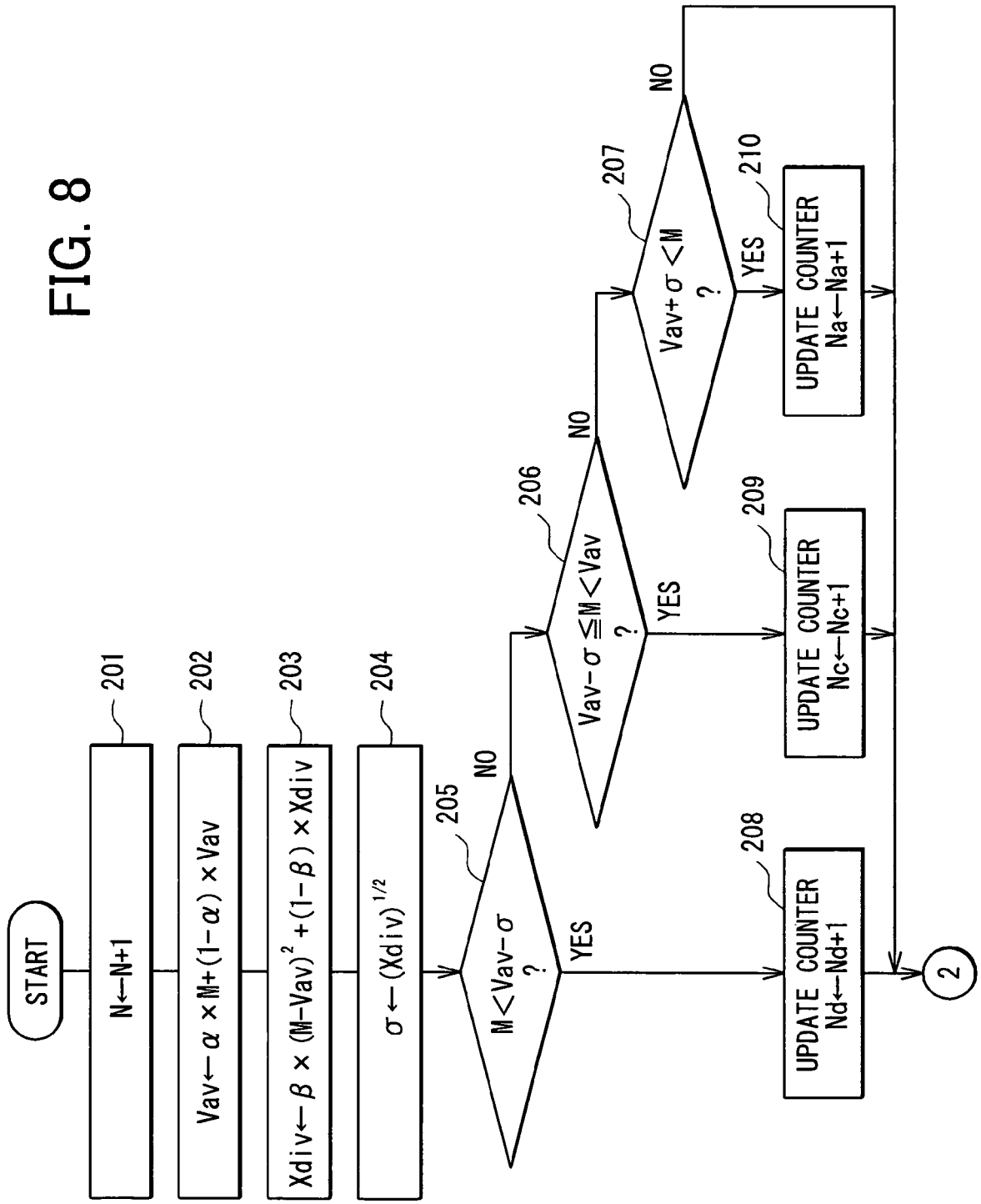
FIG. 8 is a flowchart showing a second knock determining method.
Figure 9:
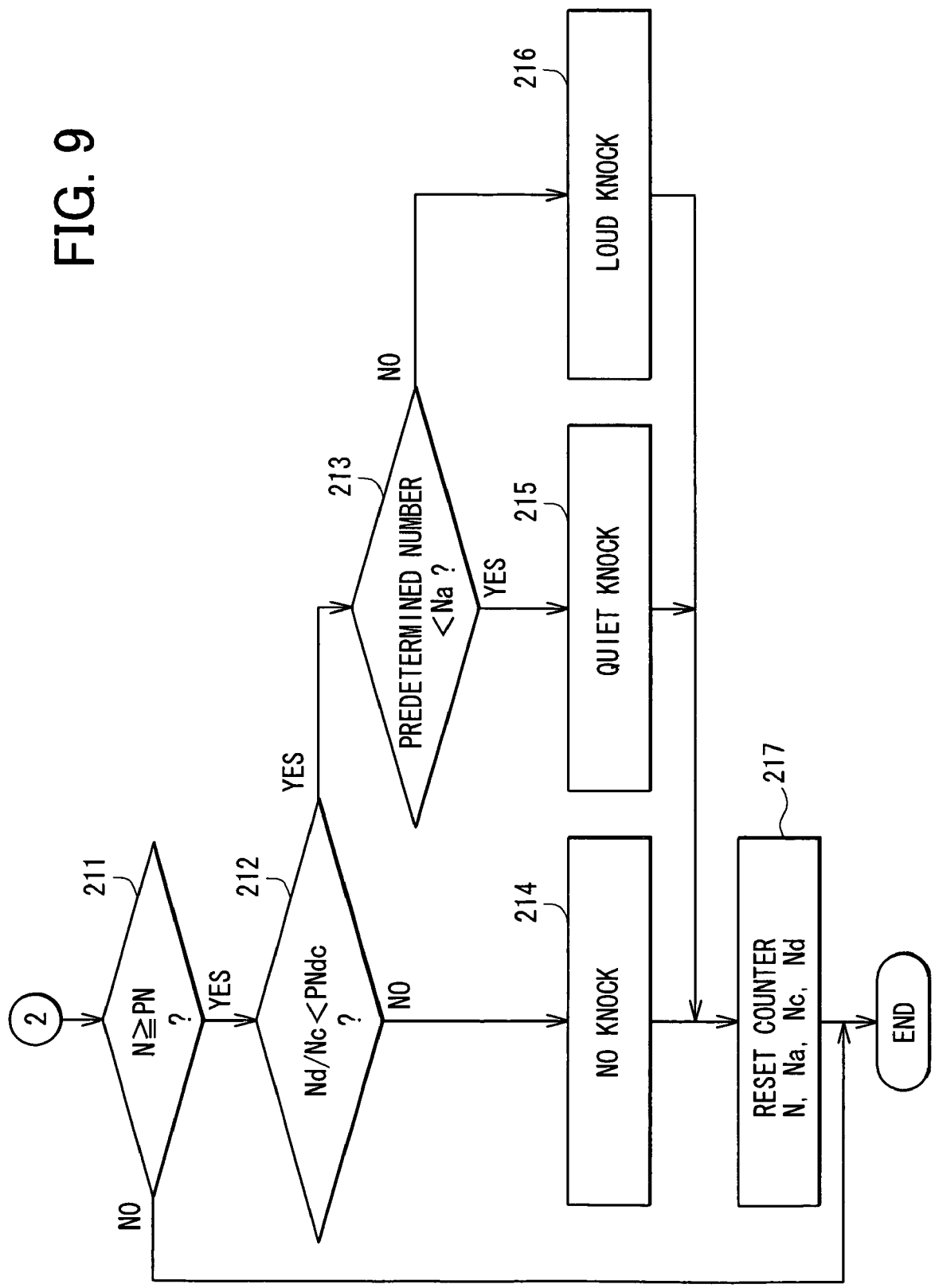
FIG. 9 is a flowchart showing the second knock determining method.

Referring to FIGS. 8 and 9, a second knock determining method will be described hereinafter. In step 201, the counter number N is incremented by 1. In steps 202 and 203, an average Vav and a variance Xdiv of the vibration intensity M are updated. Specifically, this update process is performed according to following formulas (1) and (2) by use of averaging constants $\alpha$ and $\beta$ ($0<\alpha$, $\beta<1$). In step 204, a standard deviation a is calculated according to the following formula (3). The process in step 201 is omitted in actuality.

$$\text{Vav} \leftarrow \alpha \times \text{vibration intensity } M + (1-\alpha) \times \text{Vav} \quad (1)$$

$$\text{XDiv} \leftarrow \beta \times (\text{vibration intensity } M - \text{Vav})^2 + (1-\beta) \times \text{XDiv} \quad (2)$$

$$\sigma \leftarrow (\text{Xdiv})^{0.5} \quad (3)$$

Figure 10:
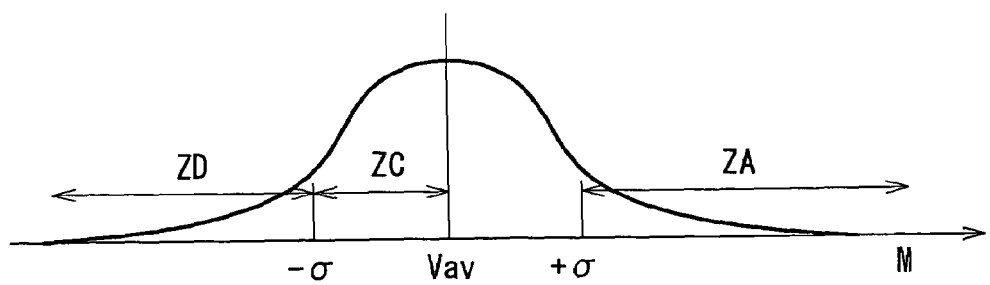
FIG. 10 is a chart for explaining a region which is used in the second knock determining method.

FIG. 10 is a chart for explaining a region in which the second method is conducted. FIG. 10 corresponds to FIG. 6. In a typical distribution of the vibration intensity as shown in FIG. 10, three regions ZA, ZC, and ZD are indicated besides the average Vav and the standard deviation $\sigma$. The vibration intensity in the region ZA is larger than (Vav+$\sigma$), the vibration intensity in the region ZD is smaller than (Vav−$\sigma$), and the vibration intensity in the region ZC is between (Vav−$\sigma$) and Vav.

Figure 11B:
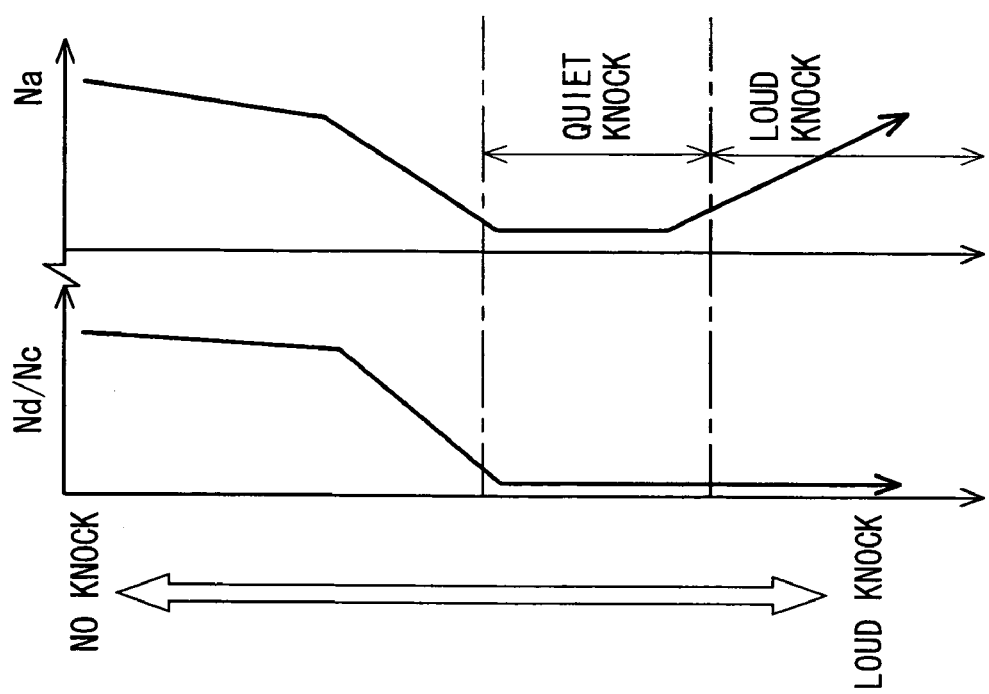
FIG. 11B is a chart showing a relationship between a knock state, a counter number ratio Nd/Nc, and a counter number N.
Figure 11A:
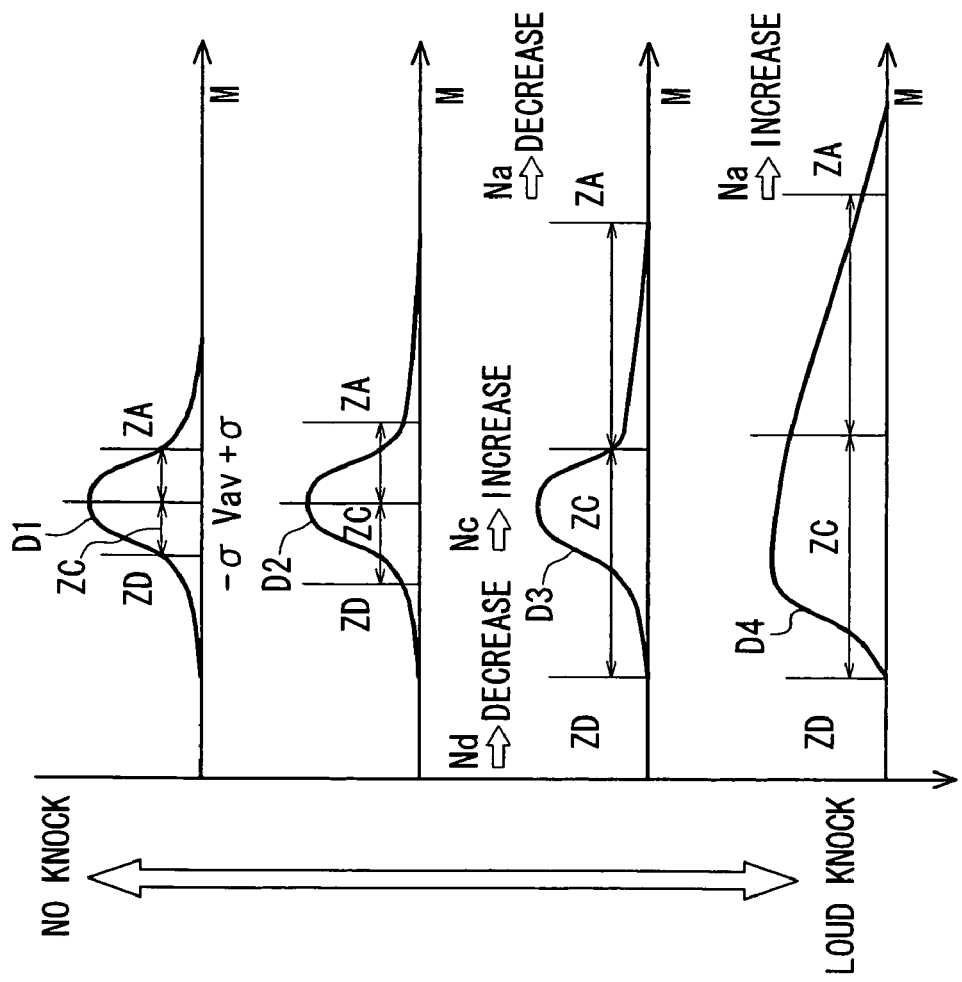
FIG. 11A is a chart for explaining the second knock determining method.

FIG. 11A shows that the vibration intensity increases from a vibration intensity distribution D1 to D4. When the vibration intensity increases, the vibration intensity distribution extends to right in FIG. 11A, whereby the average Vav is shifted to right direction and the standard deviation $\sigma$ is increased. As the result, when the vibration intensity increases, almost part of the vibration intensity distribution is included in the region ZC.

In the second method, the number of times the vibration intensity M exceeds the reference level L are calculated in each region ZA, ZC, and ZD. These numbers of times are respectively denoted by a counter number Na, Nc, and Nd. The computer determines whether the knock is occurred based on the counter number Na, Nc, and Nd, and a ratio between Nd and Nc (Nd/Nc).

FIG. 11B is a chart showing a relationship between the counter number Na, the ration Nd/Nc and the knock state. When the knock is relatively quiet, the ratio Nd/Nc is relatively large. According as the vibration intensity increases, the ratio Nd/Nc decreases. When it is in the relatively quiet knock, the ratio Nd/Nc is substantially constant. When it is in the relatively loud knock, the ratio Nd/Nc is substantially constant. In other words, the ratio Nd/Nc is useful to determine whether the knock is occurred in a region where the vibration intensity is smaller than the relatively small knock.

As shown in FIG. 11A, the vibration intensity distribution decreases in the region ZA according as the vibration intensity increases. Thus, as shown in FIG. 11B, the counter number Na in the region ZA decreases according as the vibration intensity increases. The counter number Na is substantially constant when it is in the relative quiet knock. In the distribution D4, when it is in the relative loud knock, the vibration intensity distribution becomes distorted to increase the standard deviation $\sigma$, so that the counter number Na increases again. Thus, the compute can determine whether the relative loud knock is occurred based on the counter number Na.

Referring to FIG. 8, the second method is described hereinafter. In step 205, the computer determines whether the vibration intensity M is smaller than (Vav−$\sigma$) in order to detect the vibration intensity M in the region ZD. In step 206, the computer determines whether the vibration intensity M larger than or equal to (Vav−$\sigma$) and smaller than Vav to detect the vibration intensity M in the region ZC. In step 207, the computer determines whether the vibration intensity M is larger than (Vav+$\sigma$) to detect the vibration intensity M in the region ZA. In steps 208 to 210, the counter numbers Nd, Nc, and Na in the regions ZD, ZC, and ZA are respectively incremented by 1.

In step 211 of FIG. 9, the computer determined whether the counter number N of a combustion counter exceeds the predetermined number PN. Since the counter number N is counted in step 505, the process in step 211 can be omitted.

When the answer is YES in step 211, the procedure proceeds to step 212 in which the computer determines whether the ratio between Nd and Nc (Nd/Nc) is smaller than a predetermined value PNdc. When the answer is NO, the procedure proceeds to step 214 in which the computer determines that no knock is occurred. When the answer is YES, the procedure proceeds to step 213 in which the computer determines whether the counter number Na is smaller than a predetermined number. When the answer is YES in step 213, the procedure proceeds to step 215 in which the computer determines that the relatively quiet knock is occurred. When the answer is NO is step 213, the procedure proceeds to step 216 in which the computer determines that the relatively loud knock is occurred. Then, the procedure proceeds to step 217 in which the counter numbers N, Na, Nc, and Nd are reset to end the second method. As described above, according to the second method, the knock determination is conducted by use of the ration between Nd and Nc (Nd/Nc) and the counter number Na.

Figure 12:
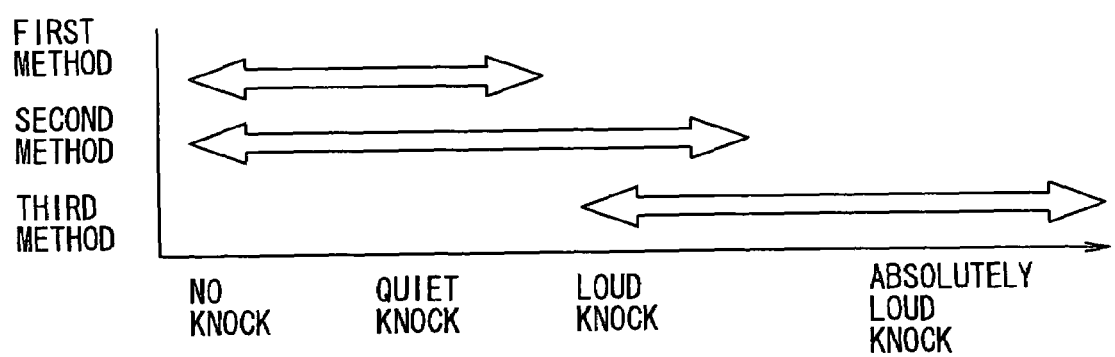
FIG. 12 is a chart for explaining ranges where the knock is detected.

FIG. 12 is a chart showing ranges in which the knock state is detected. When it is in a range from no knock to the relatively quiet knock, the first method is effective to determine the knock state. When it is in a range from no knock to the relatively loud knock, the second method is effective. When it is in a range from the relatively loud knock to an absolutely loud knock, the third method is effective to detect the knock. According to the third method, no knock state and the relatively quiet knock state cannot be detected, so that it is preferable that the third method is conducted when the computer determines that no knock is occurred according to the first method and the second method.

Figure 13:
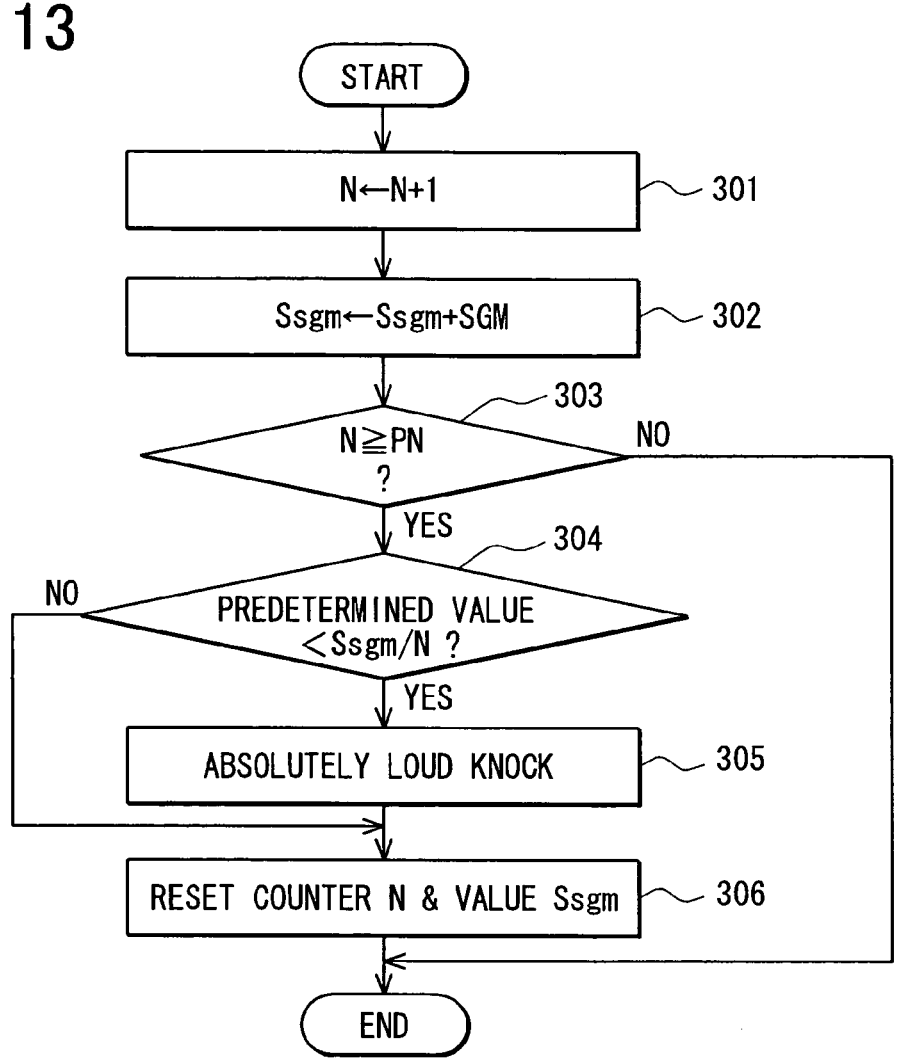
FIG. 13 is a flowchart showing a third knock determining method.

FIG. 13 is a flowchart showing the third method. In step 301, the counter number N is updated. In actuality, since the counter number N is updated in step 501, the process in step 301 can be omitted.

In step 302, an integrated value Ssgm of the dispersion index SGM is updated. In the third method, the center value VMED and the dispersion index SGM are calculated in the same way as step 101 of the first method. The dispersion index SGM is integrated to the integrated value Ssgm every time one combustion is occurred. In step 302, the integrated value Ssgm of he dispersion index SGM is updated.

Figure 14:
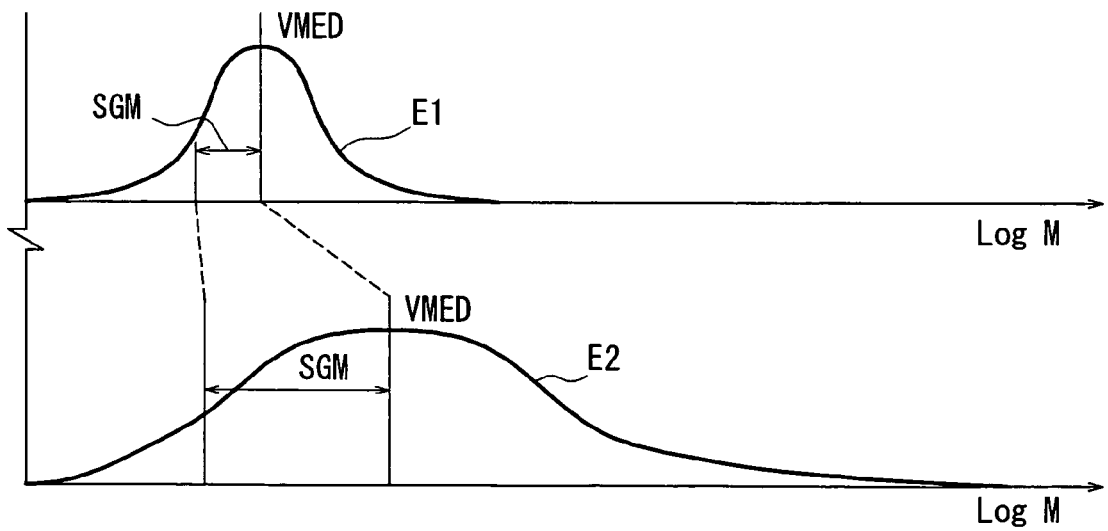
FIG. 14 is a chart for explaining the third knock determining method.

In step 303, the computer determines whether the counter number N exceeds the predetermined value PN. Since the same procedure executed in step 505, the process in step 303 can be omitted. FIG. 14 is a chart for explaining the third method. When the absolute loud knock is occurred, the vibration distribution becomes distorted in a direction where the vibration intensity increases as shown in the vibration distribution E2. Thereby, the shape of the vibration distribution E2 becomes similar to a shape of the vibration distribution E1 in which no knock is occurred. Hence, the vibration distribution E2 of the absolute loud knock cannot be determined according to the first method or second method.

However, comparing the distributions E2 with the distribution E1, the dispersion index SGM in the distribution E2 is larger than the dispersion index SGM in the distribution E1, the computer can determines whether the absolute loud knock exists or not based on the value of the dispersion index SGM. In the third method shown in FIG. 13, the average of the dispersion index SGM per N-times combustions is calculated. This average is denoted by Ssgm/N. In step 304, the computer determines whether the average Ssgm/N is larger than a predetermined value. When the answer is YES in step 304, the computer determines that a absolute noise knock is occurred in step 305. When the answer is NO in step 304, the process proceeds to step 306 in which the counter number N and the integrated value Ssgm are reset to end the procedure of the third method.

The knock determining apparatus performs the above first to the third method. Base on the determining result in the first to the third method, the reference level L is corrected.

Referring to FIG. 2 again, after step 505, the first method is performed. In step 506, when the computer determines that the relative quiet knock is occurred, the procedure proceeds to step 507 in which the computer determines whether a knock detecting counter number Nk is larger than a first upper limit U1. The first upper limit U1 and the following upper limits and lower limits are obtained based on experiments and are stored in the RAM of the ECU 27.

When the answer is YES in step 507, the procedure proceeds to step 509 in which the reference level L is increased by a correction amount ΔL, which is a relatively small amount. By increasing the reference level L, the knock is not easily detected in next time of step 502. The reference level L may be maintained without being corrected in step 509.

When the answer is NO in step 507, the procedure proceeds to step 508 in which the computer determines whether the knock detecting counter number Nk is lower than the first lower limit L1. When the answer is YES in step 508, the procedure proceeds to step 511. In this case, the knock detecting counter number Nk is relatively small in spite of the fact that the computer determines the knock is occurred in step 506. Hence, the reference level L is decreased by the correction amount ΔL, whereby the knock is easily detected in the next time of step 502. The absolute value of the correction amount ΔL in step 511 may be larger than the absolute value of the correction amount ΔL in step 509.

When the knock detecting counter number Nk is not smaller than the first lower limit L1, that is, when the knock detecting counter number Nk is lager than or equal to the first lower limit L1 and smaller than or equal to the first upper limit U1, the reference level L is unchanged in step 510.

When the answer is NO in step 506, the procedure proceeds to step 200 to perform the second method. In step 513, the computer determines whether the knock determination is conducted according to the second method. At this moment, since it is not determined that the relatively quiet knock is occurred according to the first method, the relative quiet knock is not detected according to the second method. According to the second method, since the computer can determines whether the knock state is the relatively quiet knock or the relatively loud knock, the computer determines whether the relatively loud knock is occurred in step 513.

When the computer determines the knock exists, the procedure proceeds to step 514 in which the computer determines whether the knock detecting counter Nk obtained by step 503 is larger than a second upper limit U2.

When the answer is YES, the procedure proceeds to step 516. In this case, since the knock state is the relatively loud knock, it is desirable to correct a knock detecting value to be increased even if the knock detecting counter number Nk is relatively large. Thus, in step 516, the reference level L is decreased by the correction amount ΔL or more, whereby the knock is easily detected in the next time of step 502.

When the answer in NO in step 514, the procedure proceeds to step 515. In this case, since the knock is not easily detected in spite of the relatively loud knock, it is necessary to decrease the reference level L in order to easily detect the knock. Thus, in step 515, the computer determines whether the knock detecting counter number Nk is lower than the second lower limit L2. When the answer is YES in step 515, the procedure proceeds to step 518 in which the reference lever L is decreased by a value corresponding to three times of the correction amount ΔL, whereby the knock is easily detected in the next time of step 502.

When the answer is NO in step 515, the reference level L is decreased by a value corresponding to twice of the correction amount ΔL in step 517, whereby the knock is easily detected in the next time of step 502. The correction amount should be a value between the correction amounts in step 516 and in step 518.

When the answer is NO in step 513, the procedure proceeds to step 300 to perform the third method. In step 519, the computer determines whether the knock determination is conducted according to the third method. At this moment, since the computer does not determine the relatively loud knock is occurred, the computer determines whether the absolute loud knock is occurred in step 519 according to the third method.

When the computer determines that the absolute loud knock is occurred in step 519, the procedure proceeds to step 522 in which the reference level L is decreased by a value corresponding to four times of the correction amount ΔL. In this case, since the absolute loud knock is occurred, the reference level L is decreased more than that in step 518.

When the computer determines that no absolute loud knock is occurred in step 519, the procedure proceeds to step 520 in which the knock detecting counter number Nk is larger than a third upper limit U3.

When the answer is YES in step 520, the procedure proceeds to step 523. In this case, it is likely that the computer erroneously determines the knock is occurred with respect to a combustion having no knock even though it is apparent that no knock is occurred according to the first to the third method. Hence, in step 523, the reference level L is increased by an amount corresponding to twice of the correction amount ΔL, whereby the knock is not easily detected in next time of step 502 so that erroneous determination is restricted.

When the answer is NO in step 520, the procedure proceeds to step 521 in which the computer determines whether the knock detecting counter number Nk is smaller than a third lower limit L3. The third lower limit L3 is smaller than the first and the second lower limits L1, L2. When the answer is YES in step 521, it is understood that no erroneous determination is performed so that the procedure proceeds to step 525 in which the reference level L is not corrected.

When the answer is NO in step 521, the procedure proceeds to step 524 in which the reference level L is increased by the correction amount ΔL, whereby the knock is easily detected in the next time of step 502. Then, the procedure proceeds to step 512 in which every counter is reset to end the routine.

As described above, according to the present invention, the reference levet L is corrected based on the determination results by the first to the third method, so that the knock determining threshold can be properly corrected.

Especially, the first to the third knock determining method are conducted, and the correction amount of reference level L is varied from the correction amount ΔL to the four time of the correction amount ΔL. Thus, even if the knock determining threshold is deviated from an appropriate value due to an initial adjustment mistake, the knock determining threshold can be corrected to the appropriate value in a short time.

As shown in FIG. 12, in the first to the third knock determining method, the region in which the knock is detected is different from each other. According to the first method, no knock region and the relatively quiet knock region can be detected. According to the second method, the relatively quiet knock region and the relatively loud knock region can be detected besides no knock region. According to the third method, the relatively loud knock region and the absolutely loud knock can be detected. When the first to the third method are employed, the knock determination can be performed in the entire region of the knock state. In the present invention, only one or two of the first to the third method can be employed.

In the above embodiment, the first to the third upper limit U1, U2, and U3 can be identical to each other. Similarly, the first to the third lower limit L1, L2, and L3 can be identical to each other.

The correction amounts of the reference level L can be changed if they are distinguished from each other.

What is claimed is:

1. A knock determining apparatus for an internal combustion engine, comprising:
   a sensor outputting a waveform signal which corresponds to a knock state of the internal combustion engine; and
   at least one of a first knock determining means, a second knock determining means, and a third knock determining means, for determining the knock state based on a vibration intensity distribution of the waveform signal which is outputted from the sensor during a predetermined number of times of combustions; wherein
   the first knock determining means includes:
      a calculating means for calculating a center value of the vibration intensity distribution and a dispersion index relating to the center value in a region where the vibration intensity is smaller than the center value; and
      a reference determining means for determining a statistical reference level based on the center value and the dispersion index,
   the first knock determining means determines the knock state based on a number of times the vibration intensity exceeds the statistical reference level during the predetermined number of times of combustions,
   the second knock determining means includes:
      an average calculating means for calculating an average of the vibration intensity distribution and a dispersion index relating to the average;
      a region establishing means for dividing the vibration intensity distribution in such a manner as to establish a plurality of regions based on the average and the dispersion index relating to the average; and
      a counter means for respectively counting a number of the vibration intensity in each region,
   the second knock determining means determines the knock state based on the number of the vibration intensity in each region and/or a ratio of the numbers of the vibration intensity between in each region, and
   the third knock determining means includes
      an index average calculating means for calculating an average of the dispersion index,
   the third knock determining means determines the knock state based on the average of the dispersion index.

2. A knock determining apparatus according to claim 1, wherein
   the first and the second knock determining means are provided, and
   the second knock determining means determines the knock state when the knock state is not determined by the first knock determining means.

3. A knock determining apparatus according to claim 1, wherein
   the first, the second, and the third knock determining means are provided, and the third knock determining means determines the knock state when the knock state is not determined by the first and the second knock determining means.

4. A knock determining apparatus according to claim 1, further comprising
a knock detecting means which compares the vibration intensity of the waveform signal with a threshold every one combustion, and detects a knock when the vibration intensity exceeds the threshold, wherein
the threshold is corrected by a correction amount which is established based on the knock state determined by at least one of the first to the third knock determining means.

5. A knock determining apparatus according to claim 1, further comprising:
a knock detecting means which compares the vibration intensity of the waveform signal with a threshold every one combustion, and detects a knock when the vibration intensity exceeds the threshold, and
a counter means for counting a number of knocks detected by the knock detecting means during the predetermined number of times of combustions, wherein
the threshold is corrected by a correction amount which is established based on the knock state determined by at least one of the first to the third knock determining means and the number of knocks counted by the counter means.

6. A knock determining apparatus according to claim 1, further comprising:
a knock detecting means which compares the vibration intensity of the waveform signal with a threshold every one combustion, and detects a knock when the vibration intensity exceeds the threshold, and
a counter means for counting a number of knocks detected by the knock detecting means during the predetermined number of times of combustions, wherein
in a case that the first knock determining means determines that a knock is occurred, when a count number counted by the counter means is larger than a first upper limit, the threshold is increased by a first correction amount, and when the count number is smaller than a first lower limit, the threshold is decreased by a second correction amount.

7. A knock determining apparatus according to claim 6, wherein
the first knock determining means and the second determining means are provided,
in a case that the first knock determining means determines no knock is occurred and the second knock determining means determines a knock is occurred,
when the count number is larger than a second upper limit, the threshold is decreased by a third correction amount, and
when the counter number is smaller than a second lower limit, the threshold is decreased by a fourth correction amount.

8. A knock determining apparatus according to claim 7, wherein
the first to the third knock determining means are provided,
in a case that the first to the third knock determining means determine no knock is occurred,
when the count number is larger than a third upper limit, the threshold is increased by a fifth correction amount, and
when the count number is smaller than a third lower limit, the threshold is unchanged or decreased by a amount which is smaller than the second correction amount.

9. A knock determining apparatus according to claim 8, wherein
in a case that the first and the second knock determining means determine no knock is occurred and the third knock determining means determines a knock is occurred, the threshold is decreased by a sixth correction amount.

10. A knock determining apparatus for an internal combustion engine, comprising:
a sensor outputting a waveform signal which corresponds to a knock state of the internal combustion engine; and
at least one of a first knock determining devise, a second knock determining device, and a third knock determining device, which determines the knock state based on a vibration intensity distribution of the waveform signal which is outputted from the sensor during a predetermined number of times of combustions; wherein
the first knock determining device includes:
a calculating device which calculates a center value of the vibration intensity distribution and a dispersion index relating to the center value in a region where the vibration intensity is smaller than the center value; and
a reference determining device which determines a statistical reference level based on the center value and the dispersion index,
the first knock determining device determines the knock state based on a number of times the vibration intensity exceeds the statistical reference level during the predetermined number of times of combustions,
the second knock determining device includes:
an average calculating device which calculates an average of the vibration intensity distribution and a dispersion index relating to the average;
a region establishing device which divides the vibration intensity distribution in such a manner as to establish a plurality of regions based on the average and the dispersion index relating to the average; and
a counter device which respectively counts a number of the vibration intensity in each region,
the second knock determining device determines the knock state based on the number of the vibration intensity in each region and/or a ratio of the numbers of the vibration intensity between in each region, and
the third knock determining device includes
an index average calculating device which calculates an average of the dispersion index,
the third knock determining device determines the knock state based on the average of the dispersion index.

11. A knock determining apparatus according to claim 10, wherein
the first and the second knock determining device are provided, and
the second knock determining device determines the knock state when the knock state is not determined by the first knock determining device.

12. A knock determining apparatus according to claim 10, wherein
the first, the second, and the third knock determining device are provided, and
the third knock determining device determines the knock state when the knock state is not determined by the first and the second knock determining device.

13. A knock determining apparatus according to claim 10, further comprising
   a knock detecting device which compares the vibration intensity of the waveform signal with a threshold every one combustion, and detects a knock when the vibration intensity exceeds the threshold, wherein
   the threshold is corrected by a correction amount which is established based on the knock state determined by at least one of the first to the third knock determining device.

14. A knock determining apparatus according to claim 10, further comprising:
   a knock detecting device which compares the vibration intensity of the waveform signal with a threshold every one combustion, and detects a knock when the vibration intensity exceeds the threshold, and
   a counter device which counts a number of knocks detected by the knock detecting device during the predetermined number of times of combustions, wherein
   the threshold is corrected by a correction amount which is established based on the knock state determined by at least one of the first to the third knock determining device and the number of knocks counted by the counter device.

15. A knock determining apparatus according to claim 10, further comprising:
   a knock detecting device which compares the vibration intensity of the waveform signal with a threshold every one combustion, and detects a knock when the vibration intensity exceeds the threshold, and
   a counter device which counts a number of knocks detected by the knock detecting device during the predetermined number of times of combustions, wherein
   in a case that the first knock determining device determines that a knock is occurred, when a count number counted by the counter device is larger than a first upper limit, the threshold is increased by a first correction amount, and when the count number is smaller than a first lower limit, the threshold is decreased by a second correction amount.

16. A knock determining apparatus according to claim 15, wherein
   the first knock determining device and the second determining device are provided,
   in a case that the first knock determining device determines no knock is occurred and the second knock determining device determines a knock is occurred,
   when the count number is larger than a second upper limit, the threshold is decreased by a third correction amount, and
   when the counter number is smaller than a second lower limit, the threshold is decreased by a fourth correction amount.

17. A knock determining apparatus according to claim 16, wherein
   the first to the third knock determining device are provided,
   in a case that the first to the third knock determining device determine no knock is occurred,
   when the count number is larger than a third upper limit, the threshold is increased by a fifth correction amount, and
   when the count number is smaller than a third lower limit, the threshold is unchanged or decreased by a amount which is smaller than the second correction amount.

18. A knock determining apparatus according to claim 17, wherein
   in a case that the first and the second knock determining device determine no knock is occurred and the third knock determining device determines a knock is occurred, the threshold is decreased by a sixth correction amount.

19. A knock determining method for an internal combustion engine, comprising:
   outputting step outputting a waveform signal which corresponds to a knock state of the internal combustion engine; and
   at least one of a first knock determining step, a second knock determining step, and a third knock determining step, in which the knock state is determined based on a vibration intensity distribution of the waveform signal which is outputted during a predetermined number of times of combustions; wherein
   the first knock determining step includes:
      a calculating step for calculating a center value of the vibration intensity distribution and a dispersion index relating to the center value in a region where the vibration intensity is smaller than the center value; and
      a reference determining step for determining a statistical reference level based on the center value and the dispersion index,
   in the first knock determining step, the knock state is determined based on a number of times the vibration intensity exceeds the statistical reference level during the predetermined number of times of combustions,
   the second knock determining step includes:
      an average calculating step for calculating an average of the vibration intensity distribution and a dispersion index relating to the average;
      a region establishing step for dividing the vibration intensity distribution in such a manner as to establish a plurality of regions based on the average and the dispersion index relating to the average; and
      a counter step for respectively counting a number of the vibration intensity in each region,
   in the second knock determining step, the knock state is determined based on the number of the vibration intensity in each region and/or a ratio of the numbers of the vibration intensity between in each region, and
   the third knock determining step includes
      an index average calculating step for calculating an average of the dispersion index,
   in the third knock determining step, the knock state is determined based on the average of the dispersion index.

* * * * *